United States Patent
Deaton

[15] 3,659,629
[45] May 2, 1972

[54] LIQUID FLOW REGULATOR AND MONITOR FOR CORPOREAL INFUSION SYSTEM AND METHOD OF USING THE SAME

[72] Inventor: David W. Deaton, Dallas, Tex.
[73] Assignee: Ahldea Corporation, Dallas, Tex.
[22] Filed: May 4, 1970
[21] Appl. No.: 34,121

[52] U.S. Cl..............................137/551, 73/209, 128/214, 222/59
[51] Int. Cl......................................................F16k 37/00
[58] Field of Search............137/551; 73/198, 209; 128/214, 128/214 R; 222/59

[56] References Cited

UNITED STATES PATENTS

| | | | |
|---|---|---|---|
| 536,606 | 4/1895 | Crawford et al. | 73/198 |
| 2,099,842 | 11/1937 | Connell | 73/209 X |
| 2,852,024 | 9/1958 | Ryan | 128/214 |
| 3,128,625 | 4/1964 | Heineman | 73/209 |
| 3,252,623 | 5/1966 | Corbin et al. | 222/59 |
| 3,363,461 | 1/1968 | Minkoff | 73/198 X |
| 3,500,366 | 3/1970 | Chesney et al. | 128/214 |

FOREIGN PATENTS OR APPLICATIONS

| | | | |
|---|---|---|---|
| 966,701 | 9/1957 | Germany | 128/214.2 |
| 438,611 | 11/1935 | Great Britain | 128/214 |

Primary Examiner—Henry T. Klinksiek
Attorney—Richards, Harris & Hubbard

[57] ABSTRACT

The specification is directed to a device for regulating and visually indicating the rate of fluid flow from a corporeal infusion system such as an intravenous infusion system. One embodiment of the disclosed invention includes the detection of the rate of flow of air into the container of sterile liquid to be infused into the patient. The flow rate of the liquid to the patient is then visually indicated in response to the detected rate of flow of air into the container. In another embodiment of the invention, a housing is attachable to the air inlet of a conventional corporeal infusion system and includes a valve therein for regulation of the flow of air into the liquid container of the infusion system. Regulation of the amount of air into the container directly regulates the flow rate of liquid from the container to the patient. An indicator scale on the housing visually indicates the flow rate of the liquid from the container in response to the measurement of the flow rate of air into the container. Other embodiments of the invention include utilizing a timer to control the length of infusion and utilizing an alarm system in order to maintain the liquid infusion to the patient at a predetermined level.

12 Claims, 5 Drawing Figures

Patented May 2, 1972
3,659,629
2 Sheets-Sheet 2
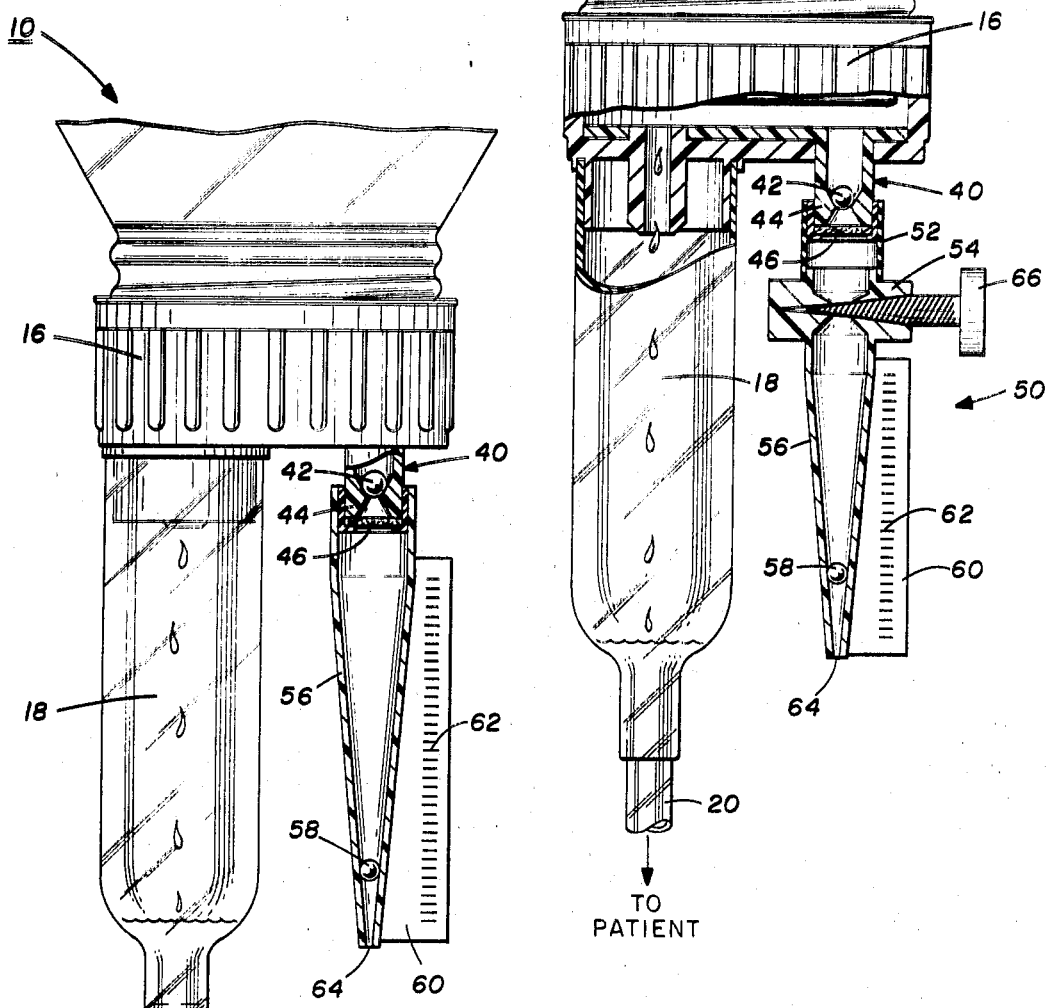
FIG. 2
FIG. 3
INVENTOR
DAVID W. DEATON
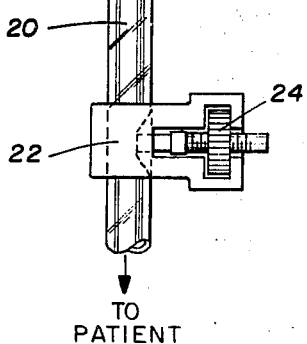
ATTORNEY

LIQUID FLOW REGULATOR AND MONITOR FOR CORPOREAL INFUSION SYSTEM AND METHOD OF USING THE SAME

FIELD OF THE INVENTION

This invention relates to corporeal infusion systems, and more particularly to a method and apparatus for regulating and monitoring the flow rate of fluid supplied to a patient from a corporeal infusion system.

THE PRIOR ART

It is necessary to administer liquids to hospital patients in a wide variety of instances. Systems for administering liquids to patients, hereinafter generally termed corporeal infusion systems, range from the commonly used intravenous fluid infusion systems to renal infusion devices, gastro-intestinal infusion devices and cardiac infusion devices. In all of these applications, it is of course extremely important to carefully meter the amount of liquid which is infused into the patient.

Corporeal infusion systems of the type described generally comprise a container of sterile liquid, an outlet connected through a flexible tube to the patient and an inlet through which air is vented into the container in order to displace the liquid drained from the container. Typical of such systems is the commonly used intravenous infusion system which includes an inverted glass bottle filled with sterile liquid such as a sugar solution and/or electrolytes and antibiotics. As the sugar solution is drained from an intravenous bottle through the flexible tube for infusion into the patient through a needle in the patient's vein, air is vented through the inverted cap of the intravenous bottle for displacement of the fluid drained from the bottle.

The most common technique for metering the liquid output from conventional intravenous bottles has heretofore comprised the manual operation of a mechanical valve in the liquid output tube with the operator mentally counting the number of drops falling into the drip chamber of the intravenous bottle during a predetermined time period. This procedure has heretofore been carried out by nurses, and is both time consuming and subject to error. Moreover, such previous regulating techniques have had to be constantly watched and readjusted due to the fact that the drip rate from an intravenous bottle often tends to vary over a period of time due to changes in the bottle height and changes in resistance to flow in the system or patient.

Devices have been proposed for elimination of the manual counting of the drop rate of an intravenous bottle, but such devices have generally been complex in nature and have required the direct regulation and monitoring of the liquid flow through the liquid output tube leading to the patient. Such devices have ranged from devices which physically sense the passage of liquid drops through the drip chamber of the intravenous bottle to flowmeter devices which are physically inserted in the tube leading from the liquid output of the intravenous bottle to the patient. Prior devices installed in the liquid output tube have been required to be sterile, and have often required expensive filters which tend to clog when heavy liquids are passed therethrough. Thus, such flowmeters have often not been usable to meter blood to a patient. Additionally, such previously developed flowmetering systems installed in the liquid output of corporeal infusion systems have tended to be difficult to both calibrate and operate due to variances in liquid viscosity from one type of infusion to another.

SUMMARY OF THE INVENTION

In accordance with the present invention, problems inherent in the direct metering of liquid flow from a corporeal infusion system are circumvented by the regulation and monitoring of the vented air flow into such containers which is necessary in order to displace the liquid drained therefrom. The present invention thus operates upon a constant viscosity gas such as air which thus provides an extremely accurate and stable regulation and monitoring system. The present system may be utilized a number of times with different corporeal infusion systems, with the use of suitable air filters therein, due to the fact that only air is entrained therethrough. The present system may be utilized on a wide variety of corporeal infusion systems operating with liquids of large differences in viscosity without substantial recalibration, due to the fact that air is monitored and regulated in each instance.

In accordance with the present invention, a container of sterile liquid includes an infusion outlet for directing liquid from the container to the patient. Structure according to the invention is provided to control the volume of gas which displaces the liquid within the container thereby controlling the flow of liquid through the infusion outlet.

In accordance with another aspect of the invention, an improvement is provided for a corporeal infusion system including a container of sterile fluid and an infusion outlet in the container for directing the fluid to a patient. An air inlet is also provided in the container for introducing air into the container to displace the fluid drained therefrom. The improvement of the present invention comprises a valve for attachment to the air inlet which is operable to selectively vary the flow of air into the container to thereby regulate the flow of the fluid through the infusion outlet.

In accordance with yet another aspect of the invention, a device is provided to visually indicate the flow rate of liquid from a corporeal infusion system wherein air displaces liquid within a container. Structure is provided to detect the rate of flow of air into the container and structure is operable in dependence upon the detection structure for visually indicating the flow rate of the liquid from the container.

In accordance with a more specific aspect of the invention, apparatus is provided to selectively regulate the flow rate of liquid from a patient circulatory infusion container which has an air inlet for admitting air to displace the liquid within the container. A valve is provided for connection to the air inlet of the container and is selectively operable to vary the flow of air into the container. An indication device is operable in response to the flow of air through the air inlet for visually displaying an indication of the flow rate of the liquid from the container.

In accordance with yet a more specific aspect of the invention, a device which accurately regulates the flow rate of liquid from an intravenous infusion container includes a housing for attachment to the air inlet of the infusion container. A valve is disposed in the housing for regulating the flow of air into the container in order to regulate the flow rate of liquid from the container. An indicator is disposed in the housing and is responsive to the flow of air through the housing for visually indicating the flow rate of liquid from the container.

In accordance with yet another aspect of the invention, a method of regulating the liquid flow to a patient from a corporeal infusion system wherein air displaces the liquid within a container includes regulating the rate of flow of air into the container in order to obtain a proportional regulation of the liquid flow rate from the container.

In accordance with another aspect of the invention, a method is provided to indicate the flow rate of liquid to a patient from a corporeal infusion system wherein air displaces the liquid within a container. The flow rate of air into the container is sensed and the liquid flow rate from the container is displayed in dependence upon the sensed flow rate of air.

DESCRIPTION OF THE DRAWINGS

For a more complete understanding of the present invention and for further objects and advantages thereof, reference is now made to the following description taken in conjunction with the accompanying drawings, in which:

FIG. 2 illustrates a somewhat diagrammatic view of a conventional intravenous infusion system in combination with the present flow regulating and metering device;

FIG. 3 illustrates another embodiment of the invention and includes a somewhat diagrammatic illustration of a conventional intravenous infusion system in combination with the present flowmeter device;

FIG. 4 is a block diagram illustrating the use of a timing circuit for controlling the supply of air to a conventional intravenous infusion system through the present flowmeter and regulation invention; and FIG. 5 is a block diagram illustrating the use of an alarm system with the regulation and flowmeter device of the invention.

DESCRIPTION OF THE PREFERRED EMBODIMENTS

Figure 1:
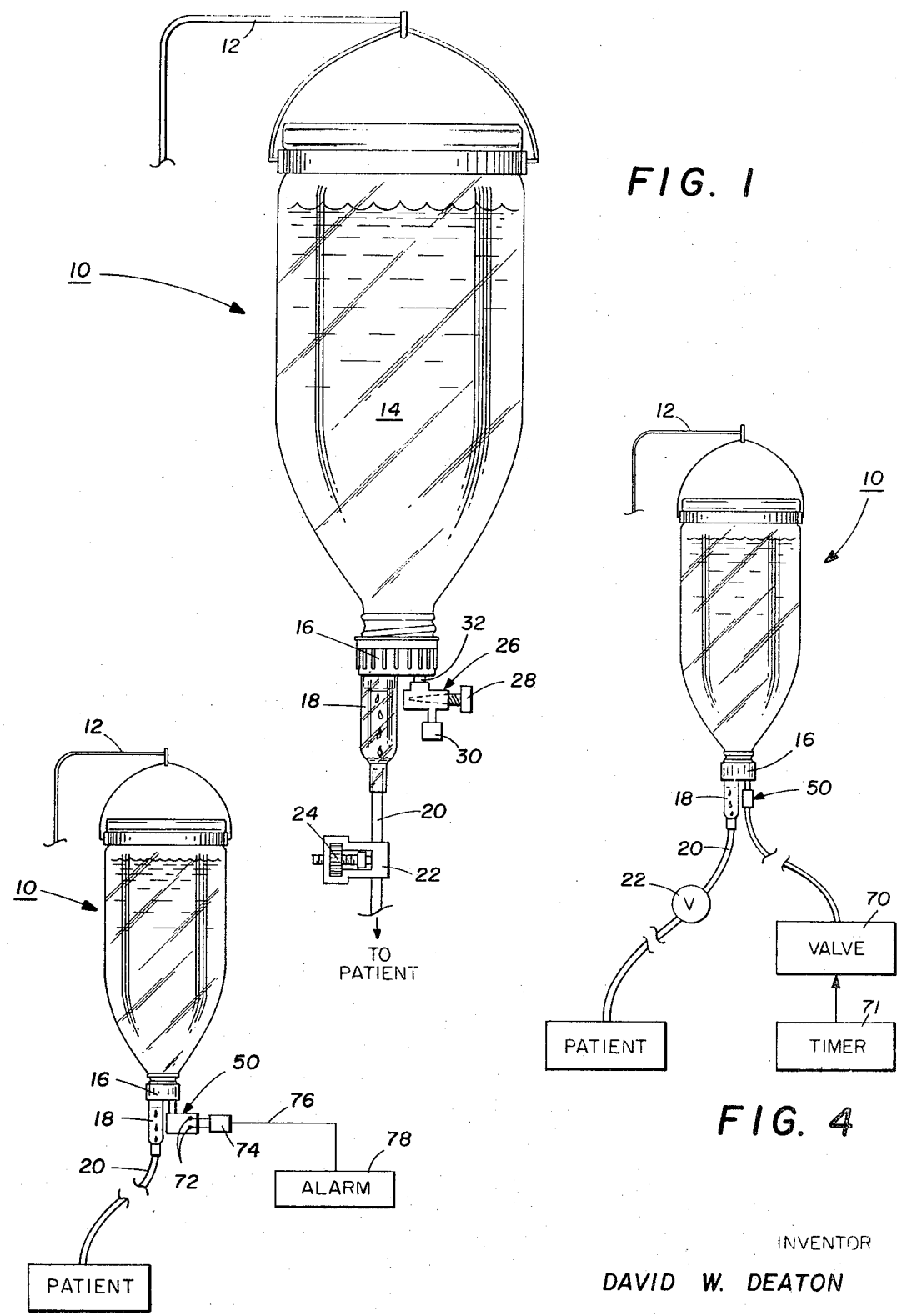
FIG. 1 illustrates a somewhat diagrammatic view of one embodiment of the invention for regulation of air into an intravenous infusion container.

Referring to FIG. 1, a conventional intravenous bottle or container 10 is supported in the conventional manner by an upstanding support pedestal 12. The bottle 10 is filled with a sterile liquid solution 14 which is to be infused into a patient. For instance, the solution 14 may comprise a sugar solution, with electrolytes or antibiotics added in some cases. It will be understood that although an intravenous bottle 10 is illustrated, the present invention may be used on any one of a number of corporeal infusion systems wherein a liquid is to be infused into the body of a patient. Thus, the solution 14 may be infused into the veins or into the arteries of the patient. The bottle 10 and solution 14 may alternatively be used as a renal infusion system wherein the patient is to be irrigated with water and/or antibiotics. Alternatively, blood may be metered from the bottle 10 into a patient.

A cap 16 is connected to the bottle 10 and includes an outlet aperture therethrough to allow the liquid solution 14 to flow from bottle 10. The liquid solution 14 falls into a drip chamber 18 and flows down a flexible tube 20 for infusion into the patient, not shown. Generally, the end of tube 20 is connected to a needle inserted into the patient. The bottle 10, cap 16, drip chamber 18 and flexible tube 20 are all conventional and are widely used throughout hospitals. Bottle 10 is generally comprised of glass, while the cap 16, drip chamber 18 and flexible tube 20 are generally comprised of plastic. A valve 22 may be used to coursely regulate the flow of fluid through the tube 20. Valve 22 includes a screw member 24 which may be manually operated to compress the tube 20 for regulation of the liquid flow therethrough. It should be understood that the illustrated intravenous infusion system is only one type of several commonly used intravenous devices. However, all such intravenous devices work according to the same operating principles and the present invention may be used to regulate and monitor liquid flow from all such devices.

Cap 16 also includes a second aperture therethrough for venting of air or other gas into the bottle 10. The venting of air is to enable the displacement of the liquid solution 14 within the bottle 10 with air for proper operation of the infusion system. In a conventional intravenous infusion system, an unimpeded air inlet, along with an air filter, is provided in cap 16 to enable the venting of air into the bottle.

According to the present invention, a needle valve assembly 26 is connected to the air venting inlet of the cap 16. Valve assembly 26 comprises a needle member 28 which may be selectively rotated within a valve housing to vary the orifice through which air is admitted into the bottle 10. Valve assembly 26 thus allows selective adjustment of the flow rate of air admitted into bottle 10. An air filter 30 is attached to the air inlet side of valve assembly 26 to enable only filtered air to be admitted into the bottle 10. Preferably, the valve assembly 26 and filter 30 are integrally connected in a plastic housing. The plastic housing includes a flexible tube 32 on the upper part thereof to enable attachment to the existing air inlet of a conventional intravenous bottle.

In operation of the present device, the valve assembly 26 is affixed to the air venting inlet of a conventional intravenous infusion system, or to the air venting inlet of any other suitable corporeal infusion systems used in hospitals or the like. The needle member 28 is then manually rotated to give the desired flow of air through the filter 30 and the needle valve assembly 26, and through the venting aperture in the cap 16 to the bottle 10. Due to the fact that the only air allowed to enter into the bottle 10 is controlled by the needle valve assembly 26, the amount of liquid which passes into the drip chamber 18 may be precisely controlled by the setting of the needle member 28. The air allowed to enter through the cap 16 bubbles through the liquid solution 14 in the conventional manner, thereby allowing a predetermined amount of liquid to pass through the cap 16 into the drip chamber 18 and through the tube 20 to the patient. The valve 22 may be used for gross initial liquid flow regulation if desired, but in many applications will not be required.

FIG. 2 is an enlarged view of another embodiment of the invention wherein a visual indication of the liquid flow rate from a corporeal infusion system is provided. Like numbers are used throughout the various figures of the application for like and corresponding parts. The conventional intravenous bottle 10 is again illustrated, along with a conventional cap 16, drip chamber 18, and flexible tubing 20 which supplies the sterile liquid within the bottle 10 to the patient. A conventional air filter assembly 40 is also illustrated which includes a one-way ball check valve 42. The ball member of the valve 42 operates to prevent leakage of the liquid solution by abutting against shoulders 44. An air filter 46 is connected to filter out impurities such as bacteria and the like from the air. Filter assembly 40 is of conventional construction presently found on commercially available intravenous bottle assemblies.

The present flow regulator and monitor is illustrated generally by the numeral 50 and includes a flexible tubing 52 which seals against the filter assembly 40 to enable the present device to be attached to a conventional intravenous bottle assembly. Tubing 52 communicates with the outlet of a needle valve 54. The inlet to the needle valve 54 is connected to a tapered channel member 56 which houses a metal ball 58. A scale 60 is connected along one side of the channel member 56 and contains calibrated indicia 62 printed thereon. The indicia is calibrated in liquid drops per minute or in milliliters per hour. The lower end 64 of the channel member 56 is open to the atmosphere. The needle valve 54 includes a needle member 66 which may be manually screwed within the valve housing in order to vary the effective orifice for passage of air through the needle valve 54.

The continuously tapered channel member 56 and the ball 58 operate as a pressure compensated flow meter to provide a visual indication of the air flow through the monitor 50. When no air is flowing into the bottom of the tapered channel member 56, the ball 58 rests at the bottom of the channel. When gas first enters the channel member 56, enough pressure must be developed to overcome the weight of the ball 58 and raise it off the open bottom of the channel member 56. A pressure difference is then developed between the bottom and top of the ball 58 to cause the ball 58 to rise in the channel and be suspended upon a cushion of air. The space between the ball 58 and the interior walls of the tapered channel member 56 increases in size due to the tapered configuration of channel 56 as the gas flow increases and the ball 58 rises higher in the channel. The ball 58 ceases to rise when the pressure on the underside thereof is sufficient to balance the effects of gravity on the ball.

In operation of the embodiment shown in FIG. 2, the assembly 50 is attached to the conventional air filter member 40 of an intravenous or other corporeal infusion system. The flexible tube 52 provides an airtight seal between the filter member 40 and the present assembly 50. Operation of the infusion system is initiated and liquid drops pass through the liquid outlet in the cap 16 and drip into the drip chamber 18. The liquid then flows down tube 20 to the patient.

In order to provide a metered flow of the sterile liquid within the bottle 10, the needle valve member 66 is rotated while the position of the ball 58 with respect to the indicia 62 is observed. When the ball 58 rises to the desired liquid flow rate indicia on the scale 60, the proper liquid flow is being applied to the patient and adjustment of the needle valve member 66 is terminated. Air flows through the aperture 64 and upwardly along the channel member 56, through the needle valve 54, through the filter 46, through the one-way ball check valve 42 and into the bottle 10 in order to vent the system. Due to the fact that the supply of air into the bottle 10 is metered, the output of liquid into the drip chamber 18 is also proportionally metered. The indicia 62 is calibrated in terms of liquid flow rate. The present device thus monitors and regulates the input of air into the closed bottle 10 in order to accurately monitor and regulate the output of liquid from the bottle 10.

The use of the system shown in FIG. 2 eliminates many of the problems heretofore experienced wherein regulating and monitoring operations were attempted in the fluid outlet lines of corporeal infusion systems. The present system is required only to meter air, and thus no problems are experienced with the present invention when metering fluids with different viscosities. It is well known that even sterile solutions contained in intravenous bottles often change viscosities due to storage time, difference in temperatures and the like. Such differences in viscosities have presented problems in flow meters which are required to directly meter the liquid output from such intravenous bottles.

Prior metering systems have also often experienced difficulties due to clogging and the like, and especially those metering systems utilizing liquid filters with relatively heavy viscosity liquids. Due to the fact that only air travels through the present flowmeter system, the present system may be detached from one corporeal infusion system and utilized on another infusion system, without the requirement of cleaning or sterilization. Such subsequent use of flowmeters is not generally possible with prior systems which must be inserted into the sterile liquid output side of corporeal infusion systems. Another advantage of the present invention is that once set, the present device tends to maintain the corporeal infusion system in a stable mode of operation. Prior systems wherein flowmeters were disposed in a liquid output of the corporeal infusion systems tend to fluctuate in liquid output due to differences in viscosity of the fluid being metered.

FIG. 3 illustrates yet another embodiment of the present invention, with like numerals being utilized for like and corresponding parts previously described. This embodiment is somewhat similar to that shown in FIG. 2, with the exception that the needle valve assembly is removed from the present device and the conventional valve 22 is utilized in the liquid output side of the bottle 10 for flow rate control. The valve 22 comprises a valve commonly used on conventional intravenous bottle systems. A housing including a tapered channel member 56 is connected to the filter assembly 40 which is found on conventional intravenous bottles. As previously noted, the filter assembly 40 includes a ball check valve 42 which seals against shoulders 44 in order to prevent the flow of liquid therethrough. A filter 46 filters the air passing into the bottle 10. A ball 58 is movable along the tapered channel member 56 and is maintained at a particular position in dependence upon the amount of air passing through the channel member 56. A scale 60 includes indicia 62 thereon for enabling a visual indication in drops per minute or in milliliters per hour of the liquid being discharged from the bottle 10. The end of the tapered channel member 56 is open to the atmosphere.

In the operation of the embodiment shown in FIG. 3, the flowmeter assembly of the invention is attached to the air inlet of a conventional intravenous infusion system. A screw member 24 of the conventional valve 22 in flexible tube 20 is regulated, while the position of the ball 58 is observed. When the ball 58 rises to the position adjacent the desired flow rate indicia on scale 60, adjustment of the member 24 is terminated and the desired flow rate is applied to the patient through the tube 20.

FIG. 4 somewhat schematically illustrates another embodiment of the present invention. An intravenous infusion bottle 10 is supported above a patient by a pedestal 12 and includes a cap 16 through which liquid from the bottle 10 falls into the drip chamber 18. The liquid is then conducted through the flexible tube 20 and through the valve 22 for infusion into the patient.

The device 50, as previously disclosed, is connected to the air inlet aperture through the cap 16. Device 50 comprises a tapered channel member 56, ball 58, a scale 60 and indicia 62 thereon in order to provide a visual indication of the rate of flow of the liquid from the bottle 10 to the patient. However, instead of the lower end of the device 50 being open to the atmosphere, the device 50 is connected via an air line to a solenoid controlled air valve 70 which is operated by a timing circuit 71. Air, or another suitable gas, is supplied through the valve 70 when the valve is open, the air then passing through the flowmeter assembly 50 to the bottle 10. The timing circuit 71 may comprise either a mechanical device or electrical circuit and may be selectively set for a desired time interval. After the expiration of the time interval, the timing circuit 71 deactivates the solenoid controlled air valve 70 and flow of air into the bottle 10 is terminated. Liquid infusion to the patient is thus stopped.

FIG. 5 illustrates yet another embodiment of the invention, wherein an alarm may be actuated when the flow of liquid to the patient exceeds predetermined high and low limits. A conventional intravenous infusion bottle 10 is supported by a pedestal 12 and supplies liquid through the cap 16, drip chamber 18 and flexible tube 20 to the patient as previously described. The present device 50 of the invention, previously described, is connected to the air inlet aperture through the cap 16. Control of the needle valve member 66 (FIG. 2) precisely controls the amount of air metered into the bottle 10 to precisely meter the amount of liquid supplied to the patient through the tube 20, as previously described.

A pair of sensing probes 72 are adapted to be positioned along the tapered channel member 56. The probes 72 are connected through a sensing circuit 74 and through lead 76 to an alarm device 78. Alarm 78 may comprise an audible alarm, energizable lights or the like.

In the preferred embodiment of the system shown in FIG. 5, the ball 58 movable along the tapered channel member 56 is comprised of metal. The sensing probes 72 are magnetic sensing probes which detect the presence of a metal object. Alternatively, the probes 72 may comprise light emitting and receiving members which detect the passage of the ball 58 thereby. The sensing circuit 74 generates an electrical signal only when the ball 58 moves from between the probes 72, in order to actuate the alarm 78.

In operation, the probes 72 are attached in accordance with the desired flow range setting on scale 60. As long as the ball 58 remains between the two probes 72, the alarm 78 is inactive. When the ball moves from between the probes 72, circuit 74 operates the alarm 78 so that an attendant may readjust the valve in the system to prevent harm to the patient. Suitable sensing and alarm systems for operation in accordance with the position of the metal ball in a flow meter are presently commercially available.

While the present invention has been described with the utilization of needle valve assemblies for adjustment of the amount of air allowed to pass into a corporeal infusion bottle, it will be understood that other types of air valves may be utilized with the invention. For instance, a suitable air valve may include a housing with a flexible tube therein for transmission of air therethrough. A screw mounted in the housing may be rotated in order to selectively compress the flexible tube in order to adjust the orifice through which the air may pass. Other types of mechanical metering valves commercially available may also be used with the invention.

Additionally, although the present flowmeter has been illustrated as comprising a pressure compensated type with a tapered channel and a ball member, it will be understood that other type of flowmeters for measuring the flow of a gas such as air may be utilized with the invention. For instance, a disc type float could be utilized instead of the ball member illustrated in the drawings. Other types of air gas flow meters usable with the invention comprise fixed or variable orifice types, or flowmeters operating according to the manometer principle.

Although the present invention will be particularly useful with intravenous infusion systems frequently utilized in hospital environments, the present technique will also be advantageous for use with other types of corporeal infusion systems such as renal, gastro-intestinal and cardiac infusion systems wherein liquid is to be metered to a patient from a container, the liquid being replaced within the container by a gas such as air.

Additionally, although the present flowmeter has been illustrated as a single tapered channel, in some instances it may be desirable to add a tortuous input and output channel in connection with the illustrated tapered channel in order to provide stabilization of the indicator ball. Such a tortuous path might include a first vertical path generally parallel to the present tapered channel and attached to the outlet of the largest end of the tapered channel 56 by a generally horizontally extending channel. A second generally vertical channel would then be spaced apart from the tapered channel 56 and communicate with the smallest end of the tapered channel 58. Other configurations of flow meter will become apparent to one skilled in the art.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A device for visually indicating the flow rate of liquid from a corporeal infusion system wherein air displaces the liquid within a container comprising:
   means for detecting the rate of flow of air into the container, and
   means operable in dependency upon said means for detecting for visually indicating the flow rate of said liquid.

2. The device of claim 1 and further comprising:
   a housing adapted to be connected to the air inlet of the container,
   indicia on said housing calibrated in terms of liquid flow rate from the container, and
   a member movable along said indicia in dependence upon the flow of air into the container, whereby the location of said member with respect to said indicia provides an indication of the flow rate of liquid from the container.

3. The device of claim 2 wherein said member comprises a ball element movable along a tapered channel through which air flows into the container.

4. The device of claim 2 and further comprising:
   means responsive to the position of said member for actuating an alarm when the liquid flow rate varies beyond a predetermined value.

5. The device of claim 2 and further comprising:
   timer means for controlling the time interval that air is supplied to the container.

6. A device for accurately regulating the flow rate of liquid from an intravenous infusion container comprising:
   a housing for attachment to the infusion container,
   a valve disposed in said housing for regulating the flow of air into the container in order to regulate the flow rate of liquid from the container, and
   indicator means attached to said housing responsive to the flow of air therethrough for visually indicating the flow rate of liquid from the container.

7. The device of claim 6 wherein said valve means comprises a needle valve.

8. The device of claim 6 wherein said indicator means comprises:
   a pressure compensated flowmeter having a member movable along a scale calibrated in liquid flow rate increments.

9. The device of claim 8 wherein said flowmeter comprises:
   a tapered channel having a member movable therealong in response to air flow through said channel.

10. The device of claim 6 and further comprising:
    means for actuating an alarm when the flow rate of liquid varies beyond predetermined limits.

11. The method of regulating the liquid flow to a patient from a corporeal infusion system wherein air displaces the liquid within a container comprising:
    regulating the rate of flow of air into the container in order to obtain a proportional regulation of the liquid flow rate from the container, and
    visually indicating the liquid flow rate from the container by detecting the flow rate of air into the container.

12. The method of indicating the flow rate of liquid to a patient from a corporeal infusion system wherein air displaces the fluid within a container comprising:
    sensing the flow rate of air into the container, and
    indicating the liquid flow rate from the container in dependence upon the sensed flow rate of air.

* * * * *